United States Patent [19]

Chida et al.

[11] Patent Number: 5,612,716

[45] Date of Patent: Mar. 18, 1997

[54] IMAGE DISPLAY DEVICE

[75] Inventors: Kenji Chida, Kawaguchi; Hiroyuki Yoshino, Higashiyamato; Jun Oshima, Fussa; Yoshiyuki Murata, Ome; Masahito Ariizumi, Fussa, all of Japan

[73] Assignee: Casio Computer Co., Ltd., Tokyo, Japan

[21] Appl. No.: 529,352

[22] Filed: Sep. 18, 1995

Related U.S. Application Data

[63] Continuation of Ser. No. 109,743, Aug. 20, 1993, abandoned.

[30] Foreign Application Priority Data

| Aug. 24, 1992 | [JP] | Japan | 4-224242 |
| Dec. 28, 1992 | [JP] | Japan | 4-349428 |
| Dec. 28, 1992 | [JP] | Japan | 4-361248 |

[51] Int. Cl.⁶ ...................................................... G09G 5/36
[52] U.S. Cl. ........................... 345/133; 345/191; 345/113
[58] Field of Search ........................................... 345/133, 113, 345/114, 115, 116, 145, 146, 156, 157, 168, 191, 112; 348/586, 578, 77; 395/135, 131; 434/323, 307 R

[56] References Cited

U.S. PATENT DOCUMENTS

| 4,261,012 | 4/1981 | Maloomian | 348/586 |
| 4,297,724 | 10/1981 | Masuda et al. | 348/586 |
| 4,539,585 | 9/1985 | Spackova et al. | 348/77 |
| 4,602,280 | 7/1986 | Maloomian | 348/77 |
| 4,730,260 | 3/1988 | Mori et al. | 395/135 |
| 4,731,743 | 3/1988 | Blancato | 348/586 |
| 4,823,285 | 4/1989 | Blancato | 348/586 |
| 4,872,056 | 10/1989 | Hicks et al. | 348/586 |
| 4,949,286 | 8/1990 | Ohba | 348/586 |
| 5,014,123 | 5/1991 | Pocock et al. | 348/7 |
| 5,041,992 | 8/1991 | Cunningham et al. | 395/135 |
| 5,057,019 | 10/1991 | Harvey | 434/155 |
| 5,280,570 | 1/1994 | Jordan | 395/135 |
| 5,319,742 | 6/1994 | Edgar | 395/131 |
| 5,375,195 | 12/1994 | Johnston | 395/135 |

FOREIGN PATENT DOCUMENTS

| 0275124 | 7/1988 | European Pat. Off. . |
| 3-129572 | 6/1991 | Japan . |

*Primary Examiner*—Richard Hjerpe
*Assistant Examiner*—Xiao M. Wu
*Attorney, Agent, or Firm*—Frishauf, Holtz, Goodman, Langer & Chick

[57] ABSTRACT

An image display device which includes a ROM 33 where a multiplicity of image data on face parts such as eyes, eyebrows, a nose, and a face contour, and a hair style is stored. The user selectively reads any image data out of the ROM 33 by operating a key input unit 32, and synthesizes the read data into portrait data. The portrait data is displayed on a display 24 and stored sequentially in a RAM 36. The stored portrait data may be set as secret data which others cannot see. The secret portrait data is displayed as a silhouette and is returned from silhouette display to portrait one only when input data matches with password data stored beforehand in a password storage 39.

2 Claims, 19 Drawing Sheets

PART PATTERN ROM (FRONT)

| No<br>PART | No.1 | No.2 | | No.20 |
|---|---|---|---|---|
| CONTOUR | ∪ | ⊔ | | ⌒ |
| HAIR STYLE | ◨ | ◨ | | ⑴⑴ |
| EYES | ◡ ◡ | ⌐ ⌐ | | ▽ ▽ |
| NOSE | ⌡ | ∧ | | △ |
| MOUTH | — | ⌒ | | △ |
| NECK-SHOULDER | ⌂ | ⌂ | | ⌂ |

FIG.3

PART PATTERN ROM (SIDE)

| No<br>PART | No.1a (BASIC) | NO.1b | |
|---|---|---|---|
| CONTOUR | ⌇ | ⌇ | |
| HAIR STYLE | ⌒ | ⌒ | |
| EYE | • | ⊙ | |
| NECK-SHOULDER | ⌂ | ⌂ | |

FIG.4

PART PATTERN ROM (WHOLE BODY)

| PART \ NO | NO.1 | NO.2 |
|---|---|---|
| FACE | | |
| TRUNK | | |
| BATH ARMS & HANDS | | |
| BOTH LEGS | | |

FIG.5

PORTRAIT RAM

| | FRONT | SIDE |
|---|---|---|
| CONTOUR | 1 | 1a |
| HAIR STYLE | 2 | 2b |
| EYES | 2 | 2a |
| NOSE | 1 | |
| MOUTH | 1 | |
| NECK-SHOULDER | 1 | 1a |

FIG.6

INDIVIDUAL'S DATA RAM

| | INDIVIDUAL'S DATA (80) | PORTRAIT (81) | F FLAG (82) |
|---|---|---|---|
| 1 | NAME:NOBUO KANAMARU<br>ADDRESS: ⋯,HINO,TOKYO<br>TEL:0425(00)⋯<br>OTHERS: BORN JAN.1,1969 |  | 1 |
| 2 | NAME:○○○○<br>ADDRESS:○○○○○○<br>TEL:○○○○○<br>OTHERS:○○○○○ |  | 0 |
| 3 | NAME:○○○○<br>ADDRESS:○○○○○○<br>TEL:○○○○○<br>OTHERS:○○○○○ |  | 1 |
| 50 | NAME:NAOKI MURATA<br>ADDRESS: ⋯,OME,TOKYO<br>TEL:0428(32)⋯<br>OTHERS:BORN JUNE.6,1990 |  | 1 |

| RETRIEVAL |

22

NAME:ICHIRO SUZUKI
ADDRESS:···,NISHIHARA,SHIBUYA-KU,
TOKYO

TEL:03-340×-☐×△○

24

| SECRET |

20a

PASSWORD?

24

| 3 | 1 | 1 | 4 |

NAME:ICHIRO SUZUKI
ADDRESS:···,NISHIHARA,SHIBUYA-KU,
TOKYO

TEL:03-340×-☐×△○

24

| PART \ NO. | MASKED | NO.1 | NO.2 | NO.3 | | NO.50 |
|---|---|---|---|---|---|---|
| CONTOUR | ▬ | | | | | |
| HAIR STYLE | ■ | | | | | |
| EYES | ■ | ⊙⊙ | △△ | | | |
| NOSE | ■ | | | ′′ | | |
| MOUTH | ■ | | | | | |

FIG.20

IMAGE DISPLAY DEVICE

This application is a continuation of application Ser. No. 08/109,743, filed Aug. 20, 1993, now abandoned.

BACKGROUND OF THE INVENTION

The present invention relates to image display devices which each display image data stored in a memory on an optical display.

PRIOR ART

Conventionally, a portrait creation device is known which combines image data on a hair style and parts of a face such as eyes, a nose, a mouth and a face contour to creates a portrait which resembles the face of a particular person, stores such image data in a memory, reads any such data out of the memory and displays such image data on a display.

Although a portrait creation device of this type useful, for example, for reminding us of the face of a person which we rarely see, it only stores data on a created portrait and displays same. Thus, which is not desired to be known to others its secrecy cannot be kept. It gives us the pastime of creating our, our family member's and our friend's portraits, but gives only the pastime of expecting how extent the portraits will resemble them.

SUMMARY OF THE INVENTION

It is therefore an object of the present invention to provide an image display device which is capable of keeping secrecy.

It is another object of the present invention to provide an image display device which has high degree of pastime.

In order to achieve those objects, the present invention provides an image display device comprising:

image data storage means for storing image data;

first display means for displaying image data stored in said image data storage means with at least part of the image data being masked;

detection means for detecting that a predetermined data keying-in operation has been performed; and second display means for displaying unmasked image data in response to said detection means having detected that the predetermined keying-in operation has been performed.

BRIEF DESCRIPTION OF THE DRAWINGS

FIG. 3 shows a stored state of data on basic part patterns in a basic part pattern ROM of FIG. 2.

FIG. 4 shows a stored state of data on other basic part patterns in the basic part pattern ROM.

FIG. 5 shows a stored state of data on still other basic part patterns in the basic part pattern ROM.

FIG. 6 shows a stored state of data on part pattern numbers in a portrait RAM of FIG. 2.

FIG. 20 shows a stored state of data in a part pattern ROM in still another embodiment of the present invention.

DETAILED DESCRIPTION OF THE PREFERRED EMBODIMENTS

Embodiments of the present invention will be described below with respect to the accompanying drawings.

Figure 1:
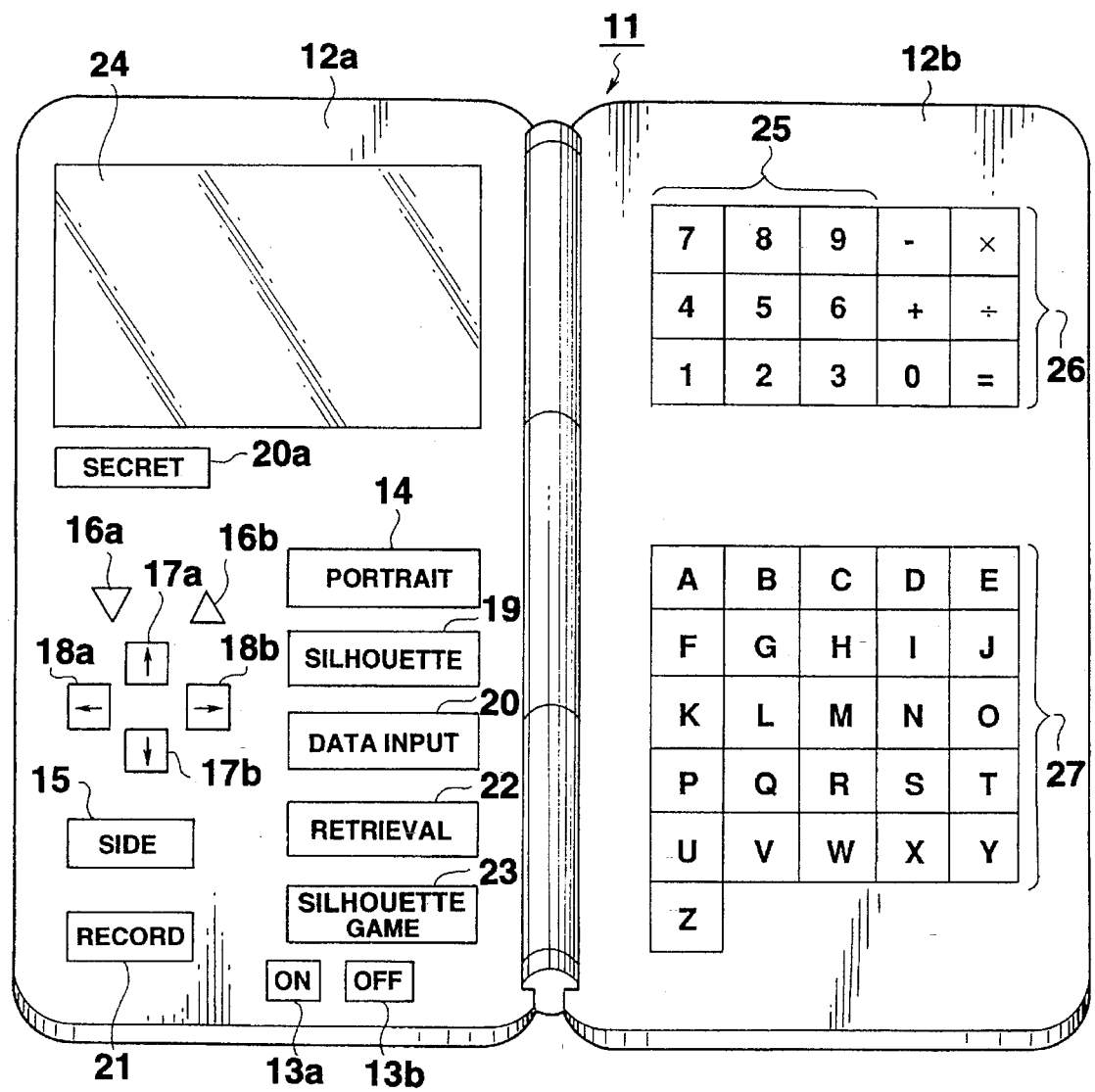
FIG. 1 shows the appearance of an electronic pocketbook which includes an image display device according to the present invention.

FIG. 1 shows the appearance of an electronic device with an image display thereon such as, for example, an electronic pocketbook. In the present invention, the electronic pocketbook is a portable electronic device which is capable of storing data on items such as individuals and/or firms and some information about the corresponding items into a memory and selectively displaying for each item the data stored in the memory as required.

The pocketbook 11 has pocketbook type casing including right-and left-hand casing halves 12a and 12b openable right and left. An operative face of the left-hand casing half 12a is provided thereon with "ON" and "OFF" keys 13a and 13b for respectively turning on and off a power supply (not shown); a "portrait creation" key 14 which is operated to set a portrait creation mode; a "side" key 15 which is operated to create an individual's side portrait in the portrait creation mode; basic portrait selection keys 16a, 16b which are used to select a basic portrait data on which is beforehand stored when a front portrait of an individual's face is to be created; part designation keys 17a, 17b which are used to designate parts such as eyes, a nose, a mouth and a face contour to be replaced with others when a front or a side portrait of an individual's face is to be created; pattern selection keys 18a, 18b which are used to select the patterns of parts which are designated as being replaced; a "silhouette creation" key 19 which is operated to set a silhouette creation mode to be described in more detail later; a "data input" key 20 which is operated to set a data input mode in which data such as that on individuals is input; a "secret" key 20a which is operated to set a portrait involving data on an individual in the data input mode while keeping the portrait secret from others except the user; a "record" key 21 which is operated to store and record data on a portrait or an individual created and input in the portrait creation mode and in the data input mode, respectively; a "retrieval" key 22 which is operated to set a data retrieval mode; and a "silhouette game" key 23 which is operated to set a silhouette game mode.

A liquid crystal dot matrix display 24 is provided on the left-hand casing half or operative face 12a of the pocketbook 11.

Provided on the right-hand casing half or operative face 12b are a ten-key unit 25 which is operated to input a numerical value to the pocketbook, an operator key unit 26 and an alphabet key unit 27 which is operated to input various data to the pocketbook.

Figure 2:
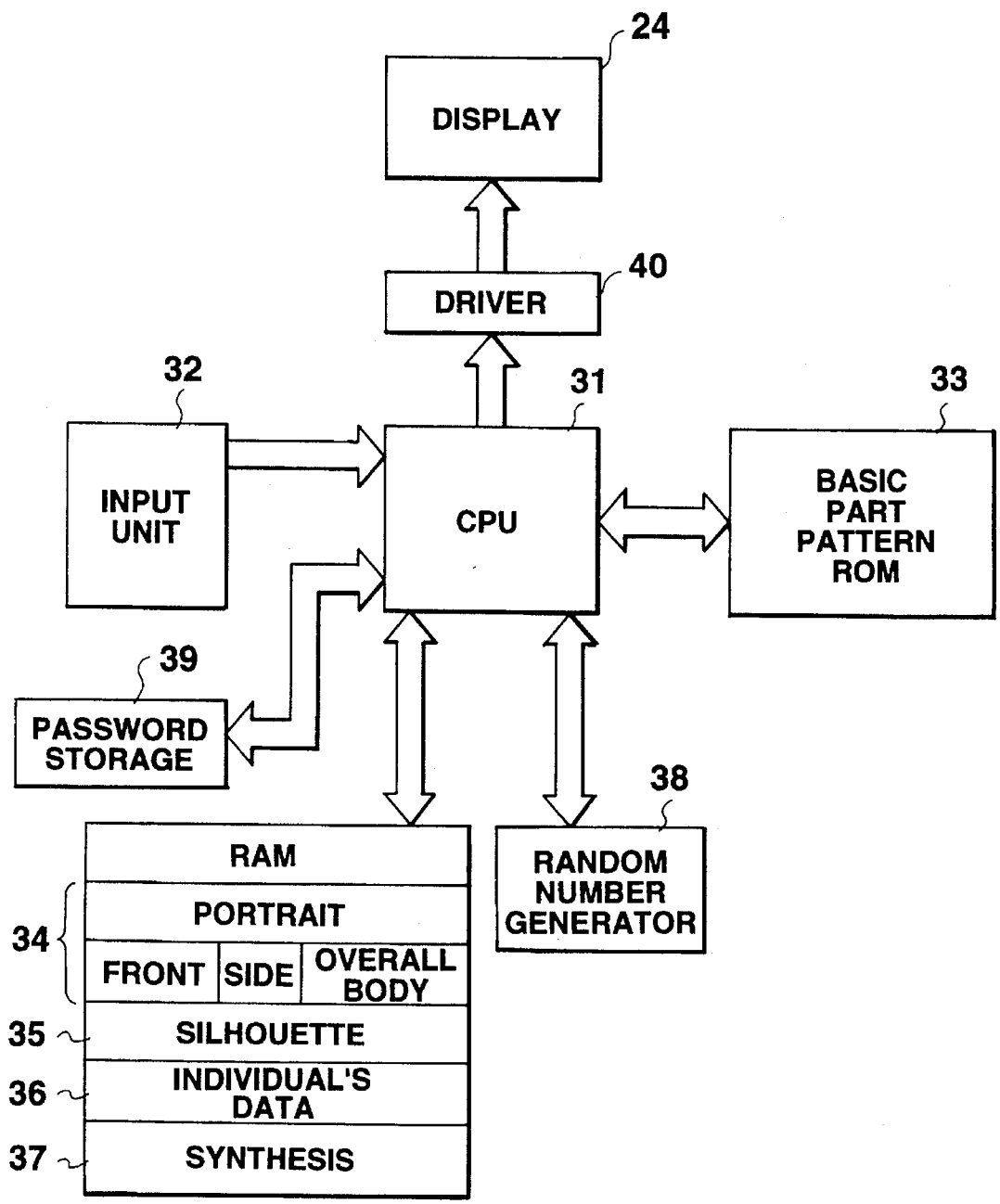
FIG. 2 is a block diagram of an electronic circuit of the pocketbook.

FIG. 2 is a block diagram of an electronic circuit of the pocketbook. A CPU (Central Processing Unit) 31 controls the respective operations of the elements of the circuit on the basis of key operation signals supplied by the various keys provided on an input unit 32 or right- and left-hand operative faces 12a, 12b of the pocketbook 11 in accordance with a pre-stored program. CPU 31 is connected to the input unit 32 as well as a basic part pattern ROM (Read Only Memory) 33, a portrait RAM (Random Access Memory) 34, a silhouette RAM 35, an individual's data RAM 36, a synthesis RAM 37, a random number generator 38, a password storage 39, and a display driver 40 connected to the display 24.

FIG. 3 shows a stored sate of image data on basic part patterns for a front portrait in the basic part pattern ROM 33.

The basic part patterns of a front portrait are for a face contour, hair style, eyes, nose, mouth, and neck-shoulder of the living body of each of a human being, animal, or spaceman. Image data on 20 kinds of part patterns for each part is numbered and stored as bit map data at predetermined positions of storage (Nos. 1–20).

FIG. 4 shows a stored state of image data on basic part patterns of a side portrait in the basic part pattern ROM 33.

The basic patterns of the parts of the side portrait are for a contour, hair style, eyes, and neck-shoulder. Image data on multiple kinds of side part patterns for each part is numbered and stored as bit map data at predetermined positions of storage (Nos. 1a, 1b, . . .). In this case, multiple kinds of side part patterns of each of an expected contour, hair style, eyes and neck-shoulder are prepared beforehand in correspondence to a respective one of the individual's front part patterns of the front contour, hair style, eyes, and neck-shoulder. For example, side part patterns "Nos. 1a, 1b, . . ." are prepared beforehand in correspondence to the contour "No. 1" of the front part pattern.

FIG. 5 shows a stored state of image data on basic part patterns for an entire portrait in the basic part pattern ROM 33.

The basic part patterns of the entire body portrait are for a face, trunk, both hands, and both legs. Image data on multiple kinds of patterns of each part is numbered as bit map data at predetermined positions "Nos. 1, 2, . . .".

Although not shown, in this case, basic part patterns of a side portrait are provided for each of the basic part patterns of the entire body portrait.

Twenty predetermined kinds of basic front portraits are obtained by a combination of patterns of parts (contour, hair style, eyes, nose, mouth, and neck-shoulder) for each of the basic part patterns "Nos. 1–20" of a front portrait in the basic part pattern ROM 33.

A side portrait corresponding to the front portrait is obtained by a selective combination of basic patterns of parts (contour, hair style, eyes, nose, mouth, and neck-shoulder) of a side portrait in correspondence to the respective part patterns of the front portrait.

In addition, many predetermined kinds of basic entire body portraits are obtained by a combination of patterns of parts (face, trunk, both hands, both legs) in each of the basic part patterns "Nos. 1, 2, . . ." of the front entire body portrait in the basic part pattern ROM 33.

FIG. 6 shows a stored state of data on the respective numbers of the part patterns composing a front and a side portrait recorded in the portrait RAM 34.

Data on the pattern numbers of the parts (contour, hair style, eyes, nose, mouth, and neck-shoulder) composing the front portrait selected by the user is stored as data on the front portrait in the portrait RAM 34 when the front portrait is to be created.

For example, according to the front portrait data, the front portrait created by the user is constructed by a combination of a contour pattern "No. 1", a hair style pattern No. 2, a nose pattern No. 2, an eye pattern "No. 1", a mouth pattern "No. 1", and a neck-shoulder "No. 1" of a front portrait in the basic part pattern ROM 33.

The pattern numbers of the parts (contour, hair style, eyes, and neck-shoulder) composing a side portrait selected by the user and corresponding to the front portrait are stored as data on the side portrait in the portrait RAM 34 when the side portrait corresponding to the front portrait is created.

For example, according to the side portrait data, the side portrait created by the user is composed of a contour pattern "No. 1a", a hair style pattern "No. 1b", eye pattern "No. 1a", and a neck-shoulder "No. 1a" of the side portrait in the basic part pattern ROM 33.

Figure 7:
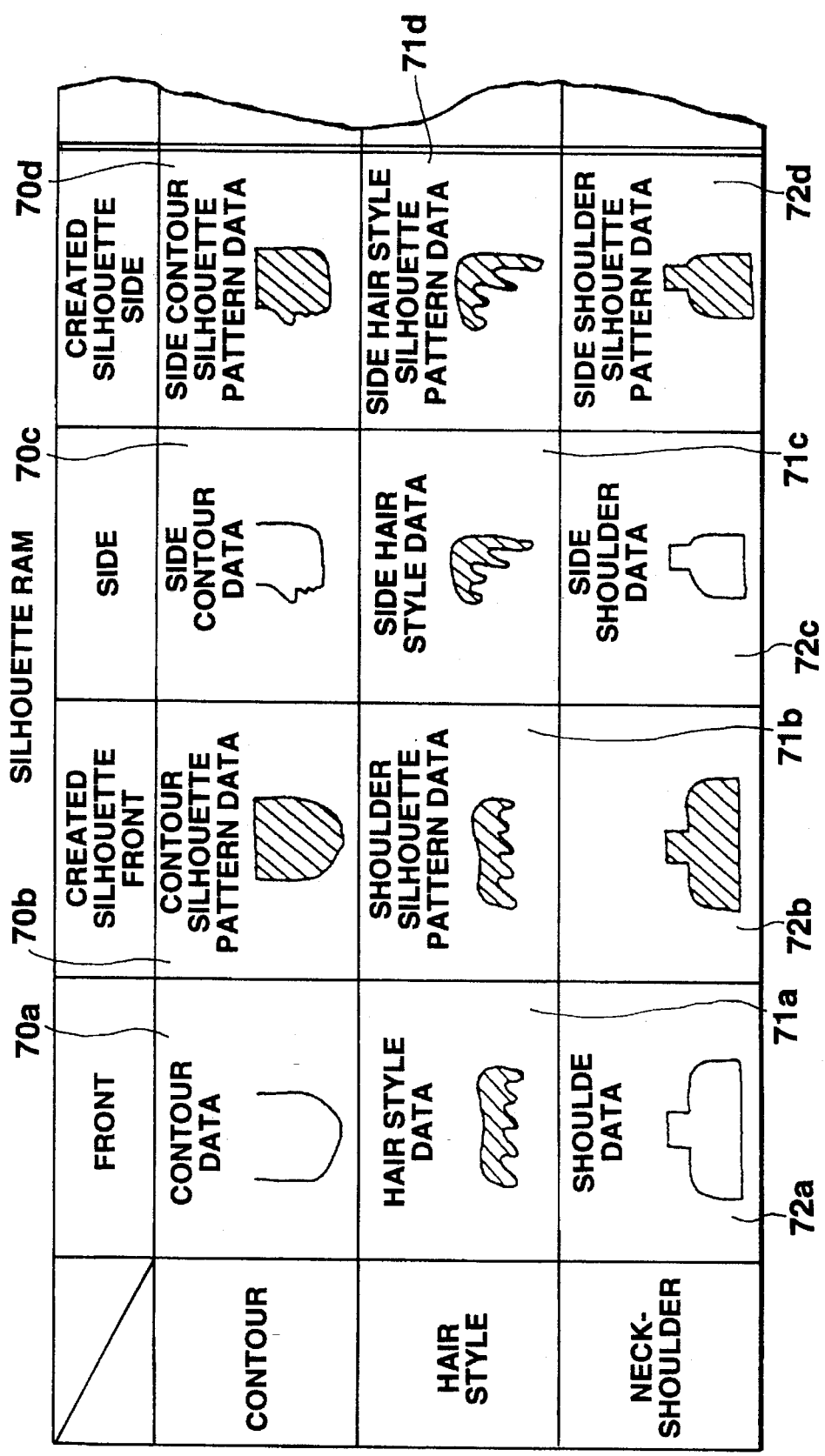
FIG. 7 shows a stored state of data on silhouette patterns in a silhouette RAM of FIG. 2.

FIG. 7 shows a stored state of data on silhouette patterns in a silhouette RAM 35.

When a contour, a hair style and a neck-shoulder one of the part patterns composing a front or a side portrait are given, the respective given patterns are masked, converted and stored in the silhouette RAM 35 as silhouette patterns, which provides silhouette image data by lighting all the dots in each of the part patterns.

Figure 8:
FIG. 8 shows a stored state of data on individuals in an individual's data RAM of FIG. 2.
Figure 8:
Figure 8:
Figure 8:

FIG. 8 shows a stored state of data on individuals in the individual's data RAM 36.

Since the individual's data RAM 36 stores data on the characters of, for example, 50 individuals each including his name, address, telephone number, etc., as well as data on his portrait. While in this case the portrait data is shown in the form of a portrait in FIG. 8, it is actually stored by data on respective numbers indicative of the part patterns stored in the basic part pattern ROM 33. A silhouette flag F which sets the presence/absence of a displayed silhouette at "1/0" is added to the portrait data.

That is, information on each of the individuals' portraits in the individual's data RAM 36 is composed of data on the numbers of the part patterns of his portrait and the silhouette flag F.

The synthesis RAM 37 stores image data on a synthetic portrait. Image data corresponding to the respective pattern numbers of the parts of the portrait data on which is stored in the portrait RAM 34 and the individual's data RAM 36 is read out of the basic part pattern ROM 33 in accordance with those pattern numbers. The read image data is synthesized and the resulting data is stored in the synthesis RAM 37, which also stores data on the synthetic image of the respective silhouette patterns stored in the silhouette RAM 35. A portrait obtained by the synthesis of the respective part patterns in the synthesis RAM 37 or a silhouette of the portrait obtained by the synthesis of silhouette patterns is displayed on the liquid crystal dot matrix display 24 through the display driver 40.

The random number generator 38 randomly generates recording numbers "1"–"50" of data on the individuals stored in the individual's data RAM 36. When a silhouette game mode to be described in more detail later is set, data on the portrait of an individual's data stored in the individual's data RAM 36 is read in accordance with the value of a random number generated by the generator 38.

The password storage unit 39 stores a password inherent to and set by the user. In an individual data retrieval mode to be described in more detail later, a retrieved portrait will be displayed in the form of a silhouette. If at this time keyed-in data matches with the user's password, the silhouette display is released and the retrieved individual data and its portrait are displayed.

The operation of the electronic pocketbook, thus constructed, will be described next.

Figure 9:
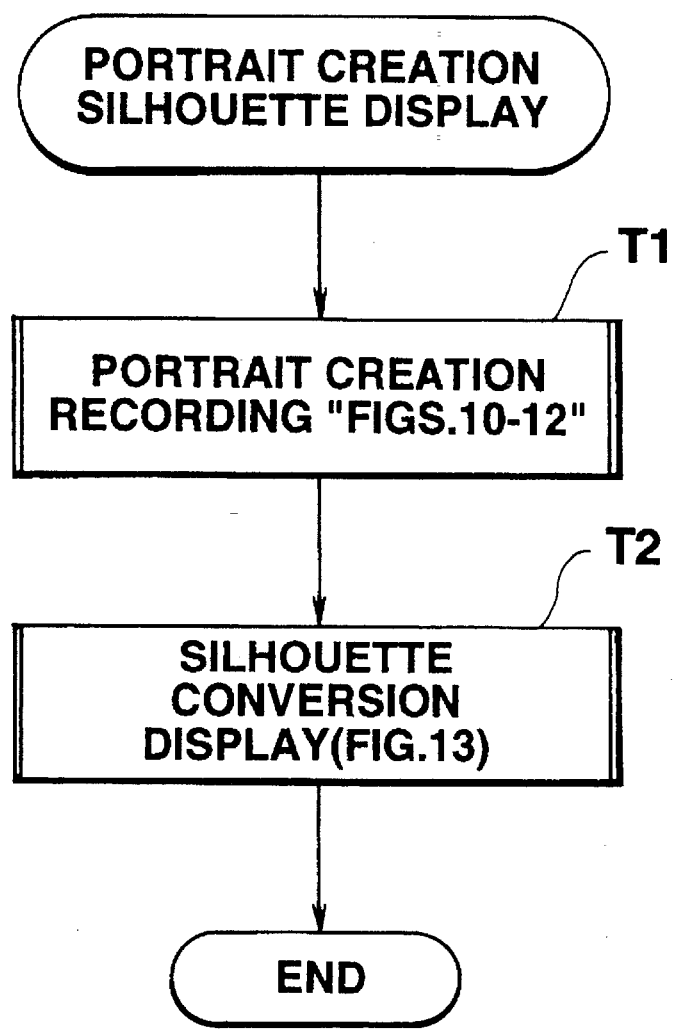
FIG. 9 is a flowchart indicative of a process for creation of a portrait and display of a silhouette.

FIG. 9 is a flowchart indicative of a basic process for creation of a portrait and display of a silhouette in the pocketbook.

A desired portrait is created in a portrait creating/recording process at step T1. The respective part patterns composing the created portrait are converted to corresponding silhouette patterns, which are then displayed in a silhouette conversion/display process at step T2.

Figure 10:
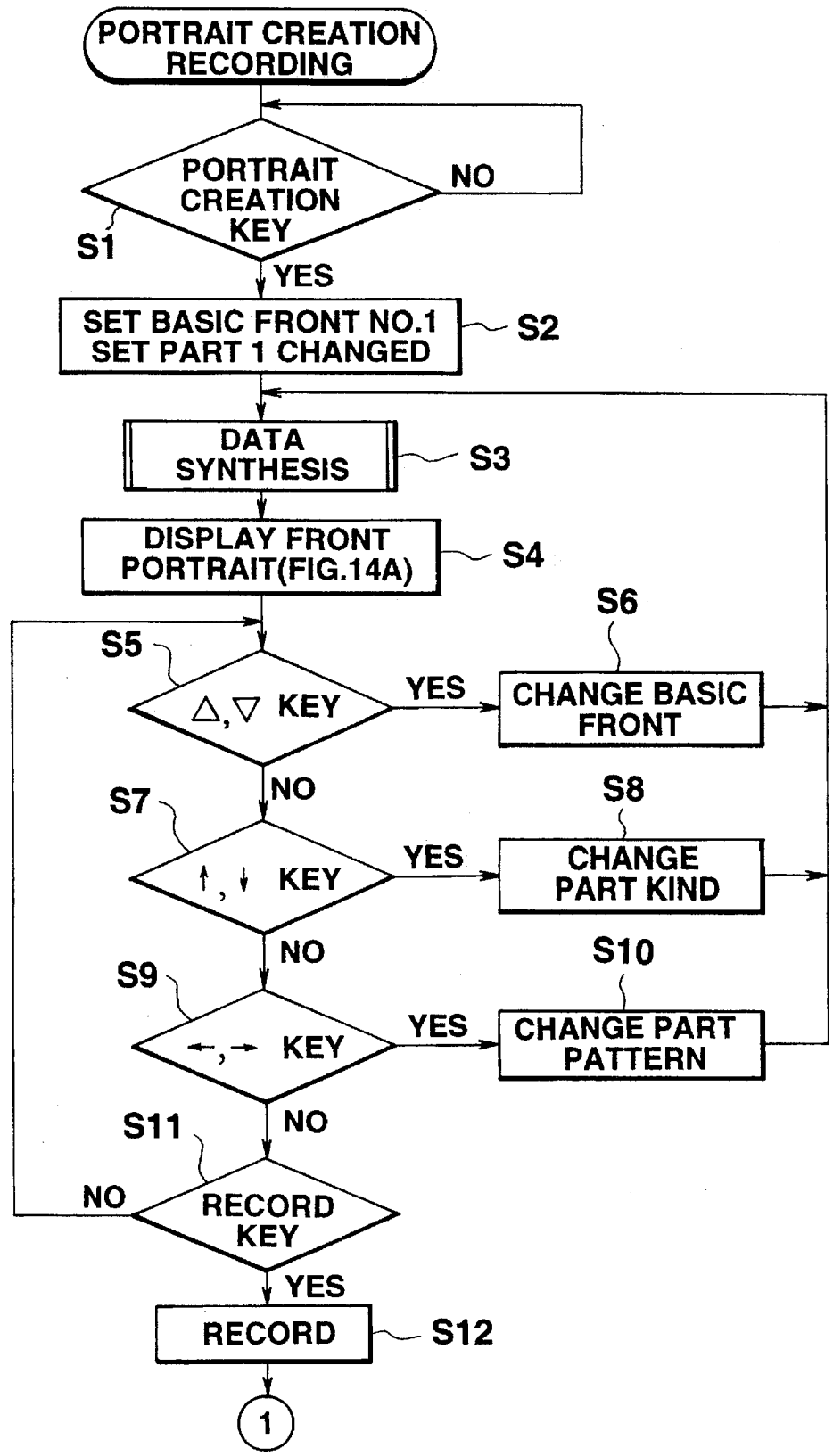
FIG. 10 is a flowchart indicative of a process for creation of a front portrait.

FIG. 10 is a flowchart indicative of a front portrait creation sub-process of the portrait creating/recording process at step T1.

Figure 11:
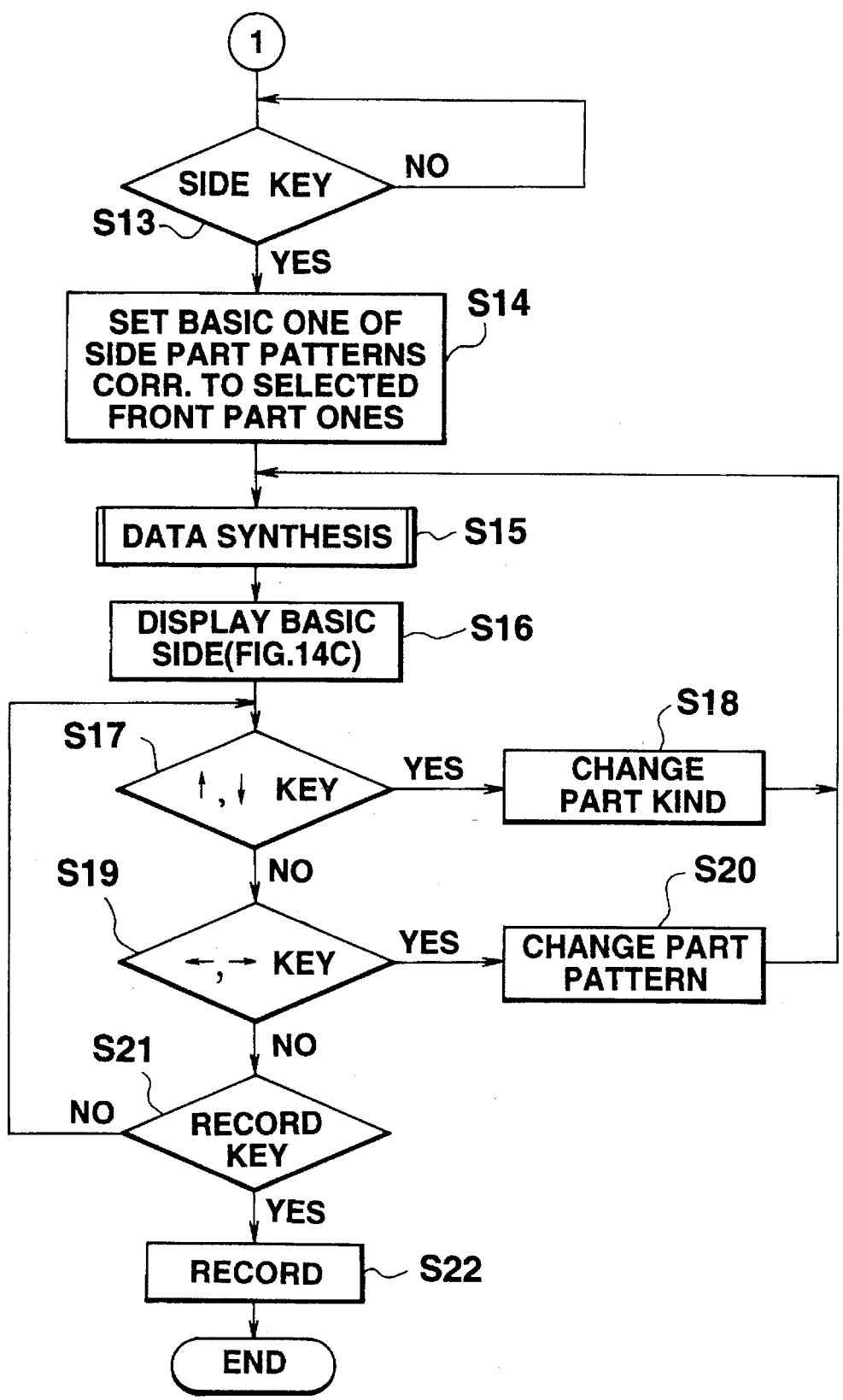
FIG. 11 is a flowchart indicative of a process for creation of a side portrait.

FIG. 11 is a flowchart indicative of a side portrait creation sub-process of the process at step T1.

In FIG. 10 when the portrait creation key 14 is operated, the CPU 31 is set in the portrait creation mode (step S1).

Then, the respective part patterns "No. 1" of a first basic front portrait are designated and set among the front part patterns in the basic part pattern ROM 33, and a first part (in this case, a contour) is set as a part having a pattern to be changed (step S2).

Then, image data on the respective front part patterns "No. 1" (FIG. 3) set as composing the first basic front portrait in the basic part pattern ROM 33 is read, transferred to and synthesized in the synthesis RAM 37 to display the first basic front portrait on the display 24 (steps S3, S4).

Figure 12:
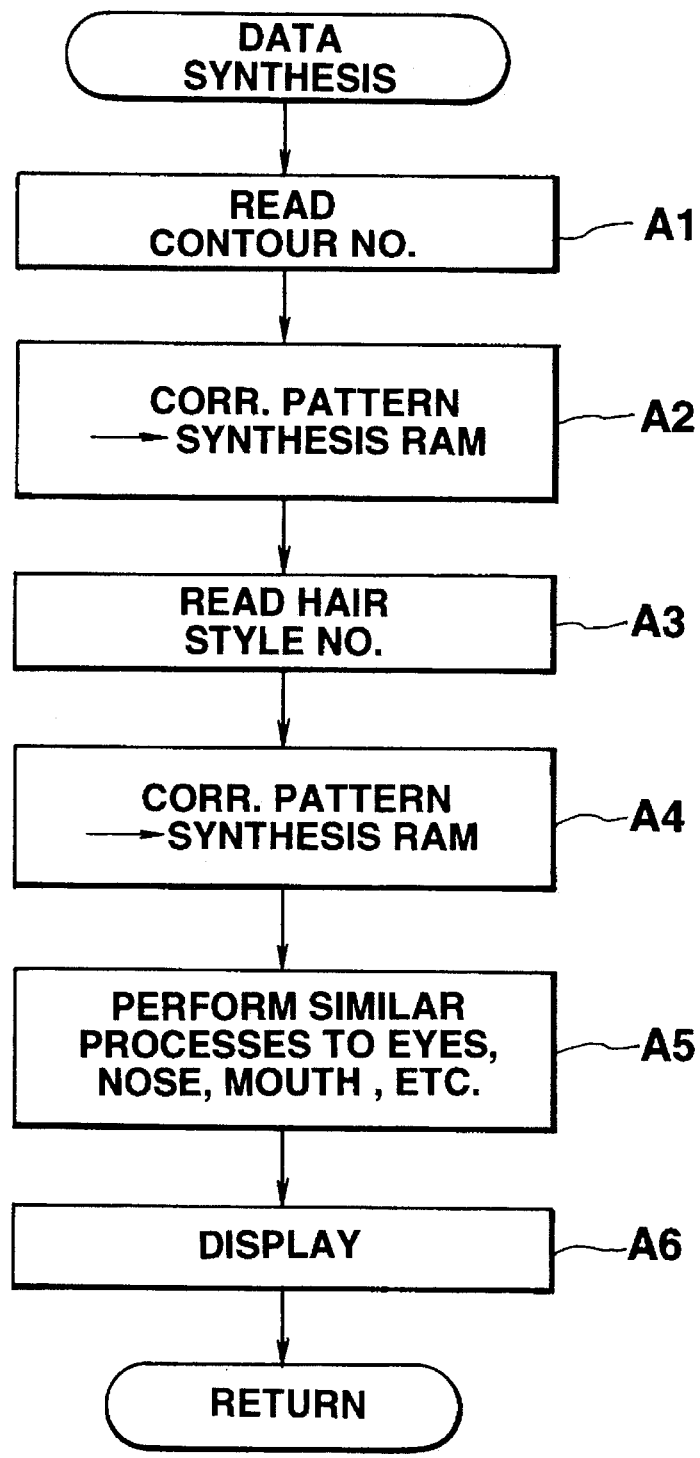
FIG. 12 is a flowchart indicative of a process for synthesis/display of image data involved in the creation of a portrait.

FIG. 12 shows the process at step S3. When the pattern numbers of the parts of a portrait to be constructed is designated to the basic part pattern ROM 33, the corresponding image data is read out of the ROM 33 and transferred to the synthesis RAM 37 (steps A1–A5 of FIG. 12).

In this case, the respective front part patterns of the first basic front portrait are sequentially synthesized in the synthesis RAM 37. Thus, the first basic front portrait composed of the respective front part patterns "No. 1" is displayed on the display 24 (step A6 in FIG. 12).

When the basic portrait selection key 16a, of the input unit 32 is operated at step S5 of FIG. 10, the respective part pattern numbers for a basic front portrait (FIG. 3) in the basic part pattern RAM 33 are changed from "No. 1" to "No. 2" (steps S5, S6).

Data on the respective front part patterns (in this case, all for "No. 2" of FIG. 3) stored in the basic part pattern ROM 33 is read and data on the respective patterns is transferred to and synthesized in the synthesis RAM 37 in accordance with the "No. 2" indicative of the respective part patterns designated as composing basic front portrait. Thus, in the case of this portrait, a second basic front portrait composed of all the part patterns "No. 2" ranging from the contour pattern to the neck-shoulder pattern is displayed on the display 24 (steps S3, S4).

That is, when the appropriate one of the basic portrait selection keys 16a, 16b of the input unit 32 is operated, the processes at steps S3–S6 are iterated, and the 20 kinds of basic front portraits stored beforehand as "No. 1" to "No. 20" in the basic part pattern ROM 33 are sequentially changed, synthesized and the resulting images are displayed.

Thus, the user beforehand selects a basic front portrait close to that which the user desires to obtain and displays it on the display 24.

When the appropriate one of the part designation keys 17a, 17b of the input unit 32 is operated, any part having a pattern to be changed is changed to another one. For example, if a particular part, for example a contour, of the basic front portrait which is selected and displayed as a portrait close to a desired front one on the display 24 by steps S3–S6 is desired to be changed to another part, for example a hair style, the appropriate one of the part designation keys 17a, 17b is required to be operated to that end (steps S7, S8).

When the appropriate one of the pattern selection keys 18a, 18b is then operated, the pattern of a front part in the basic part pattern ROM 33 and of the parts which are designated as ones to be changed is changed and selected and the changed and selected front part pattern is read out of the basic part pattern ROM 33 (FIG. 3), transferred to the synthetic RAM 37 and displayed on the display 24 instead (steps S9, S10→S3, S4).

Thus, the user arbitrarily selects and changes any part pattern other than a desired part pattern of any one of the basic front portrait patterns selected and displayed beforehand on the display 24 and displays the resulting portrait.

When the pattern of another part is desired to be changed, the appropriate one of the part designation keys 17a, 17b is operated to change the appropriate part, the appropriate one of the pattern selection keys 18a, 18b is operated to change a pattern number in any front part area of the basic part pattern ROM 33 to change all the patterns of the parts of the synthetic displayed basic portrait to any part patterns selectively to thereby create a desired front portrait (steps S7–S10→S3, S4).

Figure 14A:
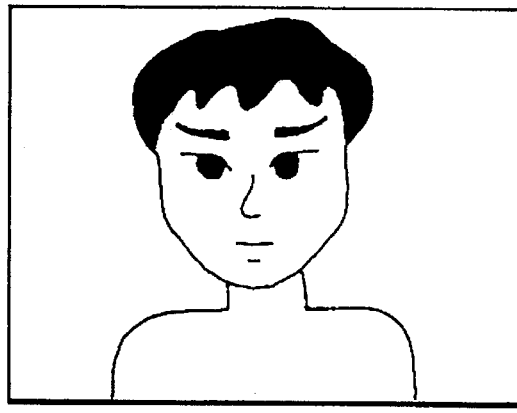
FIGS. 14A–14D show display of a portrait and its silhouette.

When, for example, a contour pattern "No. 1", a hair style pattern, "No. 2", an eye pattern "No. 2", a nose pattern "No. 1", a mouth pattern "No. 1", and a neck-shoulder pattern "No. 1" are selected as the part patterns composing a front portrait and synthesized to thereby provide a front portrait desired by the user, as shown in FIG. 14A, the "record" key 21 of the input unit 32 is operated to complete the synthesis of the front portrait and to store and record as data on a front portrait in the portrait RAM 34 (FIG. 6) the pattern numbers of the parts corresponding to the front portrait data on which is synthesized and stored in the synthesis RAM 37 (steps S4→S11, S12).

When a side portrait corresponding to the front portrait is desired to be created, the "side" key 15 is operated at step S13, as shown in FIG. 11, to set a side portrait creation mode. At the next step S14 side basic part patterns (FIG. 4) in the basic part pattern ROM 33 are set in correspondence to the respective pattern numbers of the parts of the front portrait already created and recorded in the portrait RAM 34 (FIG. 6) in the process for selection and recording of the front portrait at steps S3 to S12 (steps S13, S14).

This causes the respective part patterns of the side part patterns (FIG. 4) in the basic part pattern ROM 33 set as the basic side portrait corresponding to the front portrait at step S14 are read, transferred to and synthesized in the synthesis RAM 37, and displayed as a basic side portrait on the display 24 (steps S15, S16, i.e., steps A1–A6 of FIG. 12).

By repeated designation of parts to be changed with the part designation keys 17a, 17b and repeated selection of part patterns with the pattern selection keys 18a, 18b, data on respective side part patterns corresponding to a desired side portrait is read out of the basic part pattern ROM 33 (FIG. 4), transferred to the synthesis RAM 37 and displayed on the display 24 (steps S17-S20→S15, S16).

Figure 14B:
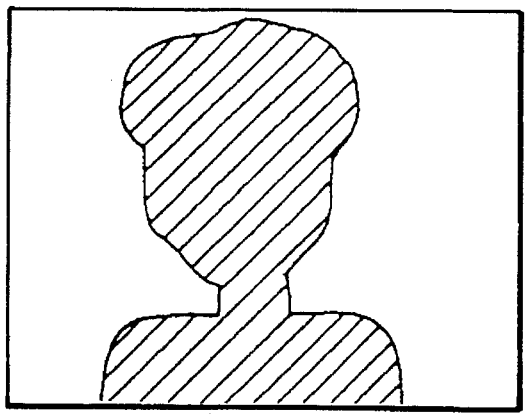
Figure 14C:
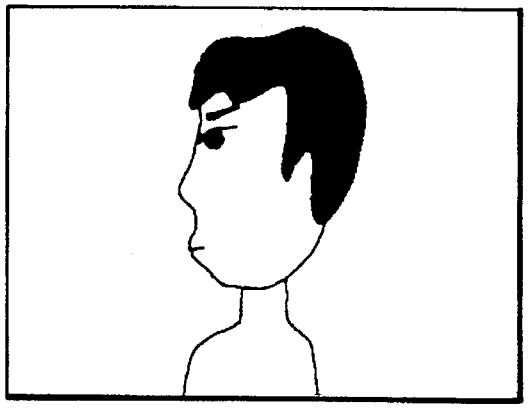

When, for example, a contour pattern "No. 1a", hair style pattern "No. 3b", eye pattern "No. 2a", and neck-shoulder pattern "No. 1a" are selected as the respective part patterns composing a side portrait and synthesized as a side portrait which the user desires to obtain, as shown in FIG. 14C, operation of the "record" key 21 of the input unit 32 completes the synthesis of the side portrait to store and record as side portrait data in the portrait RAM 34 (FIG. 6) the pattern numbers of the parts of the side portrait synthesized and stored in the synthesis RAM 37 (step S16→S21, S22).

Figure 13:
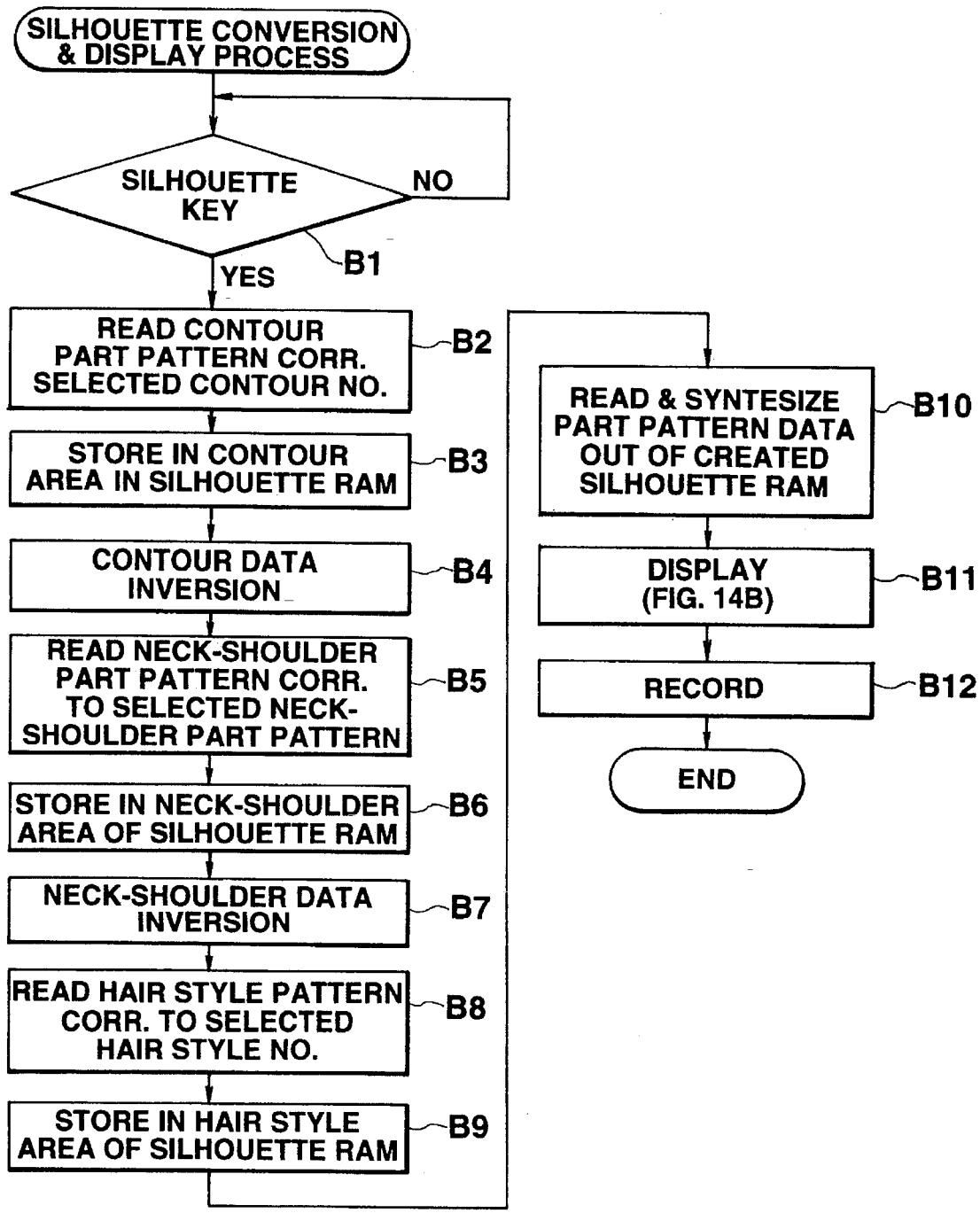
FIG. 13 is a flowchart indicative of a process for conversion of a created portrait to a silhouette and its display.

FIG. 13 is a detailed flowchart indicative of a silhouette conversion/display process. When, for example, a silhouette corresponding to the front portrait created in the front portrait creation process at the steps S1–S12 (FIG. 10) is desired to be created, the "silhouette creation" key 19 of the input unit 32 is operated to set the CPU 31 in the silhouette creation mode (step B1).

This causes a contour part pattern "No. 1" corresponding to the contour pattern number of the data on the front portrait recorded already in the portrait RAM 34 (FIG. 6) to be read out of the basic part pattern ROM 33 and stored in a front contour area 70a of the silhouette RAM 35 (FIG. 7) (steps B2, B3).

The CPU 31 reads data on the front portrait contour pattern stored in the front contour area 70a of the silhouette RAM 35, converts it to a silhouette pattern by inversion of "0" of the data on the contour to "1" and again stores data on the silhouette in a created silhouette front contour area 70b of the silhouette RAM 35 (FIG. 7) (step B4).

Subsequently, data on a neck-shoulder pattern "No. 1" corresponding to the pattern number of a neck-shoulder of the front portrait already recorded in the portrait RAM 34 (FIG. 6) is read out of the basic part pattern ROM 33 and stored in a front neck-shoulder area 72a of the silhouette RAM 35 (FIG. 7) (steps B5, B6).

The CPU 31 then reads data on the neck-shoulder pattern of the front portrait stored in the front neck-shoulder area 72a of the silhouette RAM 35, inverts "0" in the data to "1" to thereby convert the front neck-shoulder pattern to a silhouette pattern and stores the data on the silhouette pattern in the created silhouette front neck-shoulder area 72b in the silhouette RAM 35 (FIG. 7)(step B7).

Data on a hair style part pattern "No. 2" corresponding to that of the front portrait already recorded in the portrait RAM 34 (FIG. 6) is read out of the basic part pattern ROM 33, stored in the front hair style area 71a in the silhouette RAM 35 (FIG. 7), and also stored intactly in the created silhouette front hair style area 71a (steps B8, B9).

The CPU 31 then reads data on the respective silhouette patterns stored in the created silhouette part areas 70b, 71b, 72b in the silhouette RAM 35, transfers the data to the synthesis RAM 37, synthesizes the data in the RAM 37 and displays the resulting image as a silhouette corresponding to the front portrait obtained in the front portrait creation mode, as shown in FIG. 14B (steps B10, B11).

In this case, data on the silhouette patterns created and displayed in the processes at steps B1–B11 is intactly stored and recorded in the respective created silhouette front part areas 70b, 71b, 72b of the silhouette RAM 35 (step B12).

Figure 14D:
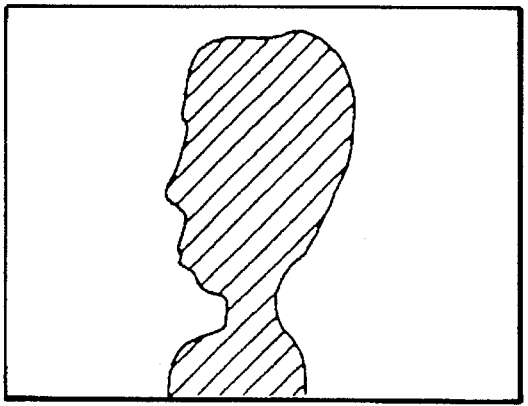

Also, when a silhouette corresponding to the side portrait created in the side portrait creation processes at steps S13–S22 (FIG. 11) is desired to be created, a silhouette conversion/display process (FIG. 13) similar to that mentioned above is performed. Data on the respective silhouette patterns of the parts corresponding to data on the side portrait stored in respective side part areas 70c, 71c, 72c is converted, displayed, for example, as shown in FIG. 14D, stored or recorded in the respective created silhouette side part areas 70d, 71d and 72d of the silhouette RAM 35 (FIG. 7).

Figure 15:
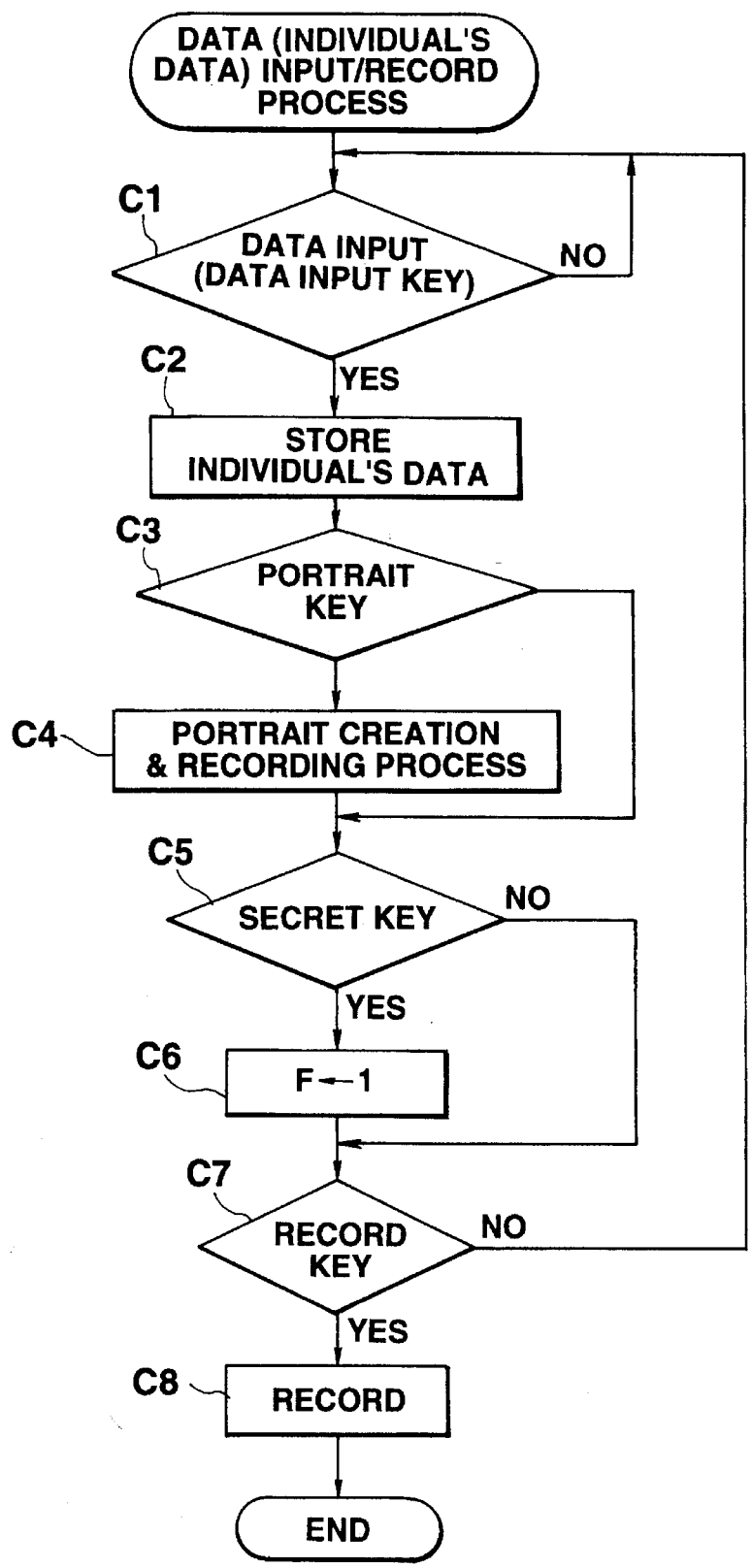
FIG. 15 is a flowchart indicative of a process for inputting and recording data on individuals into the pocketbook.

FIG. 15 is a flowchart indicative of a process for inputting/recording data such as character data in the pocketbook.

Operation of the "data input" key 20 of the input unit 32 to record data on an individual and data on its portrait in the individual's data RAM 36 (FIG. 8) causes the CPU 31 to be set in the data input mode.

When various character input keys 25, 26, 27 are operated to input data items on a particular individual's name, address, telephone number, and date of his birth, those input data items are sequentially stored in an individual's data area 80 of the individual's data RAM 36 (FIG. 8) (steps C1, C2).

The CPU 31 then creates a front portrait corresponding to the individual's data stored in the individual's data area 80 of the individual's data RAM 36 in the portrait creation/ recording process (FIGS. 10–12) and records data on the front portrait in the portrait RAM 34 (steps C3, C4).

When the individual's portrait created in the portrait creation process is desired to be kept secret from persons other than the user, the "secret" key 20a is operated, which sets a secret flag F at "1" in a secret flag area 82 provided in the portrait data storage area 81 (steps C5, C6).

After data on an individual and his portrait is input/ created and the presence/absence of the secret flag F is set for the portrait data, the "record" key 21 is operated, which causes the data on the portrait created beforehand in the front portrait creation process at steps C3, C4 to be read out of the portrait RAM 34, transferred to, stored and recorded in the portrait area 81 corresponding to the individual's data area 80 of the individual's data RAM 36 which stores data on individuals (steps C7, C8).

Thus, information on an individual including desired data on an individual and its portrait is recorded in the individual's data RAM 36.

Figure 16:
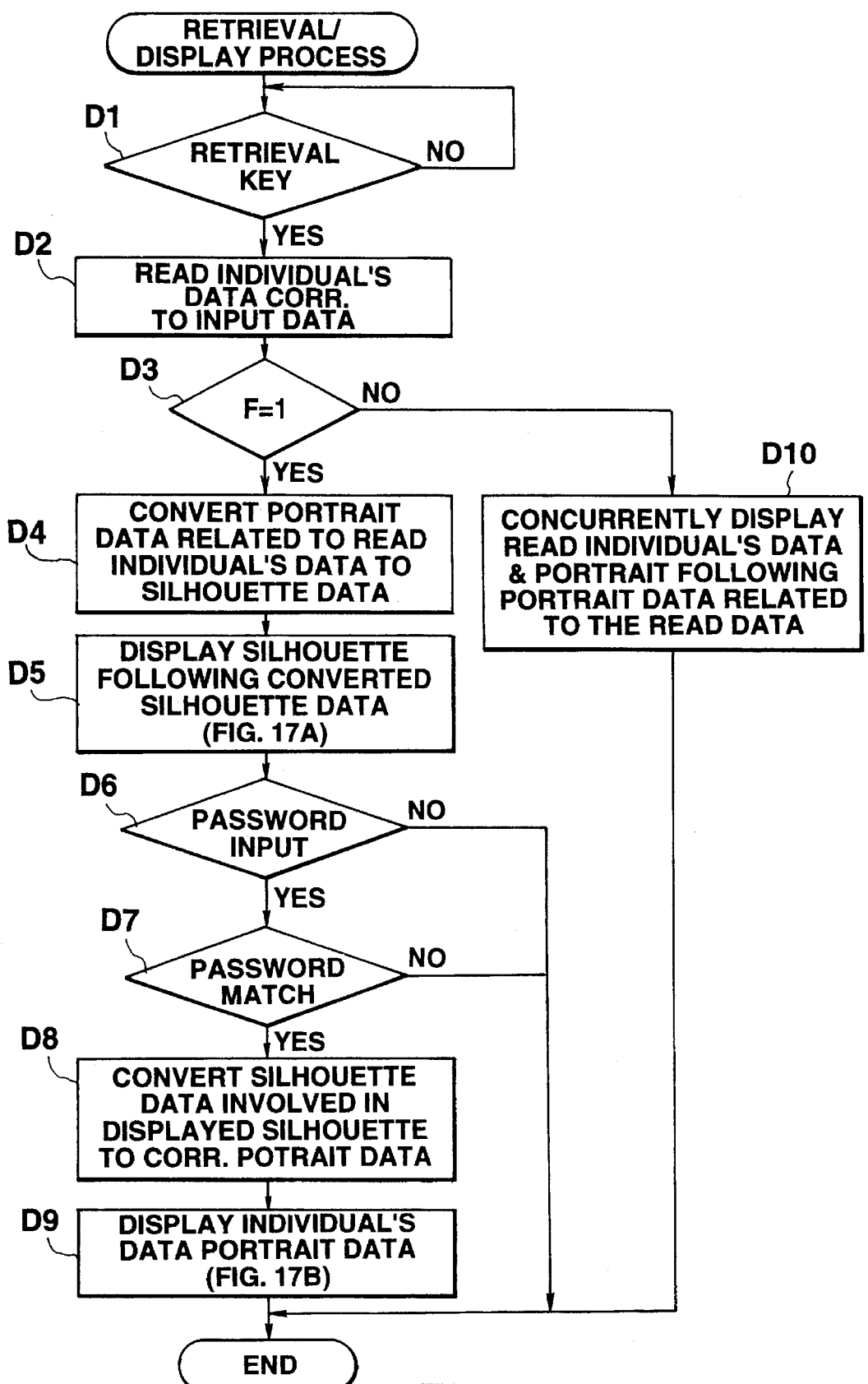
FIG. 16 is a flowchart indicative of a process for retrieval and display of data on individuals in the pocketbook.

FIG. 16 is a flowchart indicative of a process for retrieval and display of the data on the individuals recorded as mentioned above.

FIG. 17 shows the display of data on an individual involved in the individual's data retrieval/display process.

When the "retrieval" key 22 is operated to retrieve desired data on an individual recorded beforehand in the individual's data RAM 36 in the data input/recording process (FIG. 15), the CPU 31 is set in the data retrieval mode. When a person's name is then input through the alphabetic key "A–Z" unit and the ten-key unit, the CPU 31 reads data on the individual corresponding to the name in the individual's data RAM 36 (FIG. 8)(steps D1, D2).

Figure 17A:
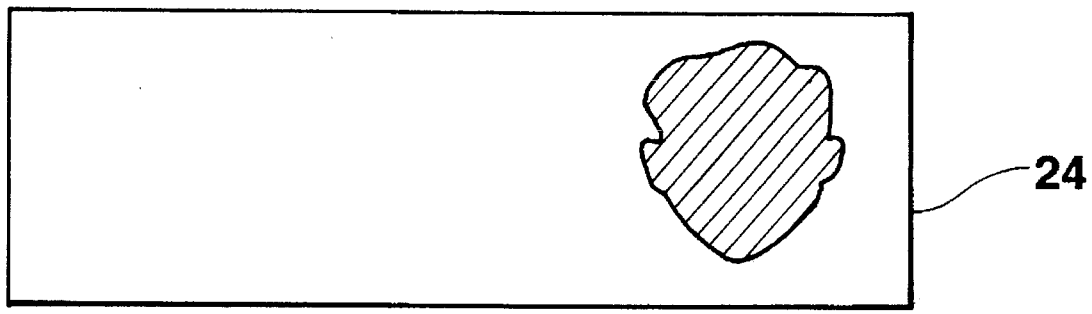
FIGS. 17A and 17B show a state of display of data on an individual involved in retrieval and display of the data on the individual stored in the pocketbook.

When the CPU 31 reads, for example, data on an individual corresponding to a record number "1" in the individual's data area 80 of the individual's data RAM 36, and determines that the secret flag added to the portrait data is set at "1", the data on the portrait is converted to data on a silhouette in the silhouette conversion/display process (FIG. 13) and the retrieved individual's portrait is displayed as a silhouette on the display 24, as shown in FIG. 17A (steps D3–D5).

That is, when recorded data on an individual is retrieved with a secret flag F being set beforehand, the portrait involved in the data on the individual is first displayed in the form of a silhouette.

Figure 17B:
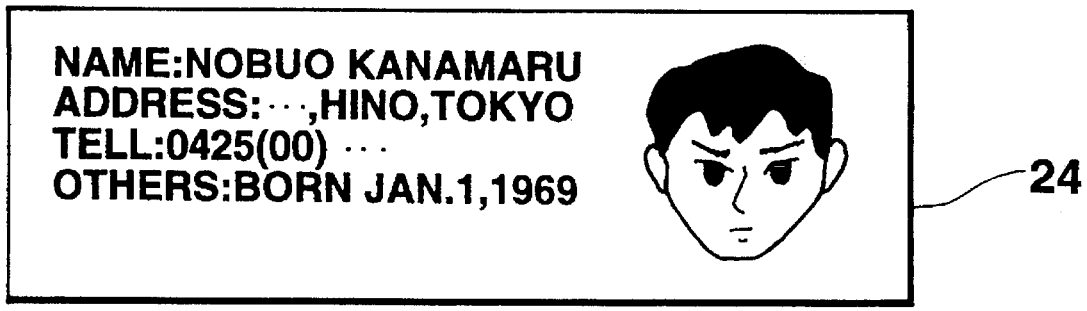

When the CPU 31 determines that a password input by the operation of the ten-key unit 25 to release the silhouette state of the portrait matches with a password unique to the user and stored beforehand in the password storage unit 39, it converts the current displayed silhouette again to a basic part pattern the data on which is stored in the silhouette RAM 35 (FIG. 7) in correspondence to a silhouette pattern of each of the parts (contour, hair style, neck-shoulder) to thereby release the silhouette state, as shown in FIG. 17B (steps D6–D8).

The contents of data on the individual such as "name", "address", and "telephone number" read beforehand at step D2 are displayed on the display 24 along with the individual's portrait the silhouette state of which has been released (step D9).

If the secret flag F is not set in the flag area 82 for the portrait data, for example, as shown by a record number "2" when data on the individual to be retrieved is read out at step D2, data on the respective part patterns corresponding to the read data on the individual is read out of the basic part pattern ROM 33, and synthesized in the synthesis RAM 37 and the resulting portrait is displayed concurrently along with the read data on the individual on the display 24, as shown in FIG. 17B (step D3→D10).

Thus, data on an individual and his portrait which is not desired to be known to others except for the user is explicitly displayed only when the user's password matches.

Figure 18:
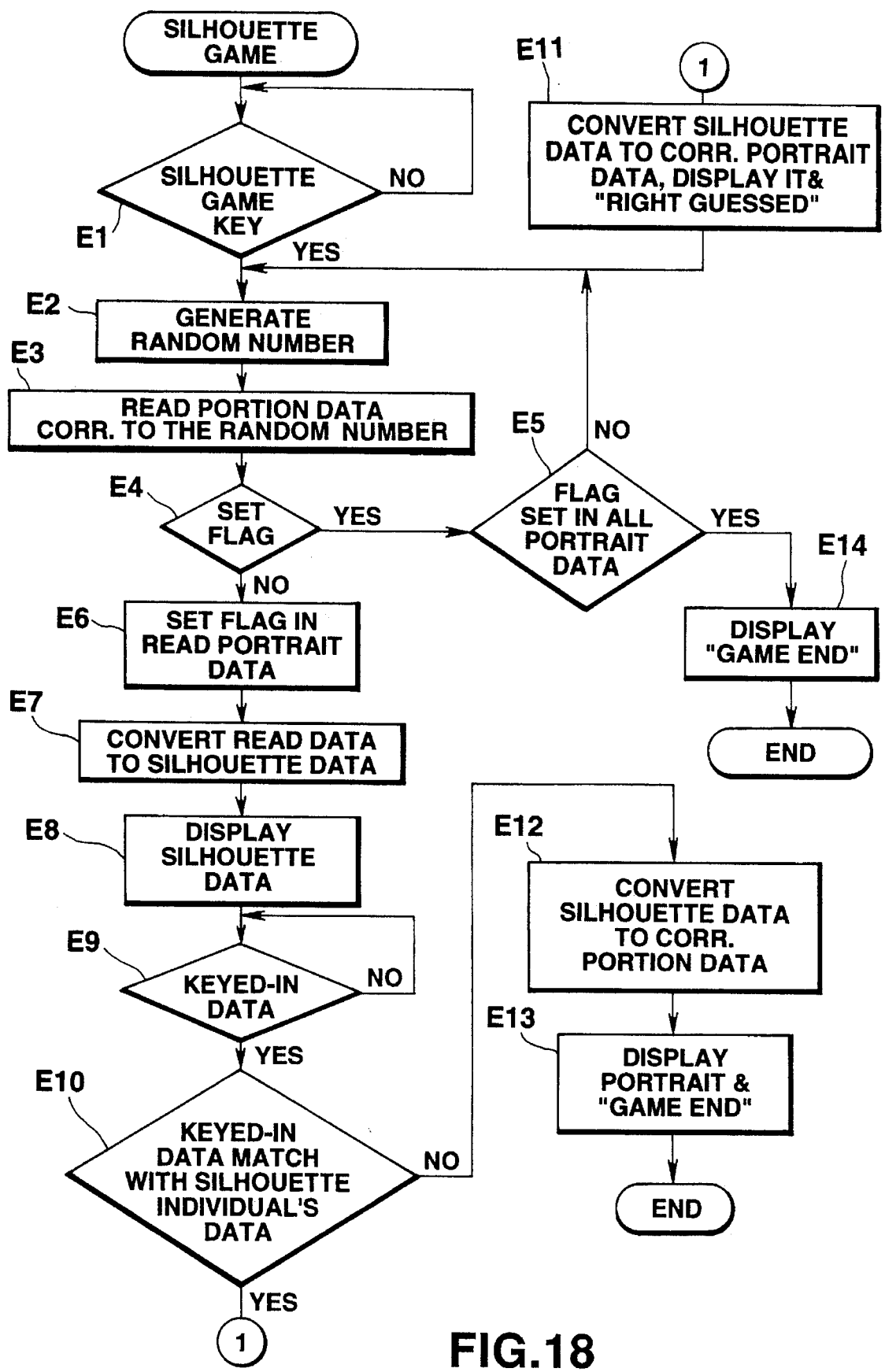
FIG. 18 is a flowchart indicative of a silhouette guessing game process in the pocketbook.

FIG. 18 is a flowchart indicative of a process for enjoying a silhouette guessing game of the electronic pocketbook.

When a "silhouette game" key 23 is operated to enjoy a silhouette guessing game using data on individuals recorded beforehand in the individual's data ROM 36, the CPU 31 is set in a silhouette game mode (step E1).

This causes the random number generator 38 to generate a random number value corresponding to an appropriate one of individual's data recording numbers (1–50) stored in the individual's data RAM 36 (FIG. 8). The CPU 31 reads data on the individual related to an individual's data recording number corresponding to the generated random number value, and recorded data on the portrait (steps E2, E3).

If the secret flag F is set at "1" in the portrait data read by the CPU 31, the portrait data is handled as being kept secret and not displayed on the display 24. The random number generator 38 again generates another random number value and the CPU 31 reads data on a portrait related to an individual's data record number corresponding to the random number value (steps E4→E5→E2, E3).

If the secret flag F is not set in the data on the portrait read by the CPU 31 at step E3, the secret flag F is set at "1" for the read data on the portrait to indicate that silhouette display to be described in more detail later has once made. Then the silhouette conversion/display process (FIG. 13) is performed to convert/store the read portrait silhouette pattern in the silhouette RAM 35 (FIG. 7) (step E4→E6, E7).

This causes the respective silhouette patterns of the parts obtained in the silhouette RAM 35 to be synthesized in the synthesis RAM 37 and displayed as a silhouette on the display 24 (step E8).

When the CPU 31 determines that keyed-in data on an individual (for example, name) expected on the basis of the silhouette displayed on the display 24 matches with data on the individual (name) corresponding to data on the portrait for the current displayed silhouette and read out of the individual's data RAM 36 at step E6, the respective part silhouette patterns of the current displayed silhouette are re-converted to corresponding basic part patterns data on which is stored in the silhouette RAM 35 (FIG. 7) to release the silhouette state and a message "right guessed" is displayed along with the individual's portrait the silhouette of which is released (steps E9, E10→E11).

This causes the random number generator 38 to again generate another random number value, and data on a portrait recorded as another data on an individual corresponding to the random number value is read out (step E11→E2, E3).

When the CPU 31 determines that keyed-in data on the individual (for example, name) expected on the basis of the current displayed silhouette at step E9 does not match with data on the individual (name) corresponding to data on the portrait for the current displayed silhouette, the respective part silhouette patterns of the current displayed silhouette are re-converted to corresponding basic part patterns data on which is stored in the silhouette RAM 35 (FIG. 7) to thereby release the silhouette state and display a message "game end" along with the individual's portrait the silhouette state of which is released (steps E9, E10→E12, E13).

Thereafter, repetition of the steps E2–E13 leads to enjoying the game of guessing silhouettes of portraits corresponding to data on all the individuals (1–50 in FIG. 8) stored in the individual's data RAM 36. If "yes" at step E5 or if it is determined that the secret flag F is set at "1" in data on the portraits corresponding to data on all the individuals (1–50), the message "all games ended" is displayed on the display 24 (step E5→E14).

Thus, according to the present electronic pocketbook, when a silhouette of a portrait is displayed which is constructed by a combination of part patterns data on which is stored for each of the parts of, for example, a face (contour, hair style, eyes, nose, mouth, neck-shoulder) in the basic part pattern ROM 33, each of the patterns of the parts (contour, hair style, neck-shoulder) composing the contour of the portrait is converted to a corresponding silhouette pattern by inverting "0" of data in that pattern to "1". The resulting data on the silhouette patterns is stored in the silhouette RAM 35. The respective silhouette patterns of the parts are combined and synthesized in the synthesis RAM 37. The resulting silhouette is displayed on the display 24. Thus, no separate silhouette pattern storage RAMs are required to be provided in addition to the basic part pattern ROM 33 which stores data on the basic parts of the portrait and a silhouette matching with the portrait pattern is easily displayed.

Figure 19A:
FIGS. 19A–19C show key inputs and corresponding displays in another embodiment of the present invention.
Figure 19B:
Figure 19C:

While in the embodiment a silhouette is displayed by lighting all dot-like data indicators in a part pattern, a portrait may be displayed which has a masked part of a part pattern. FIGS. 19A–19C show an example of displaying a silhouette with a masked part of a portrait. FIG. 19A shows an example of displaying an address and a telephone number of Mr. Ichiro Suzuki along with his portrait being masked at eyes by operation of the retrieval key 22. By operation of the secret key 20a, "what is your password?" is displayed, as shown in FIG. 19B. Thus, when a password, for example, of numerals "3", "1", "4", "1" are keyed in and this password matches with the password already stored, a portrait with unmasked eyes is displayed, as shown in FIG. 19C.

While the portrait's eyes are displayed masked in FIGS. 19A–19C, other parts of the portrait may be displayed masked.

Figure 21A:
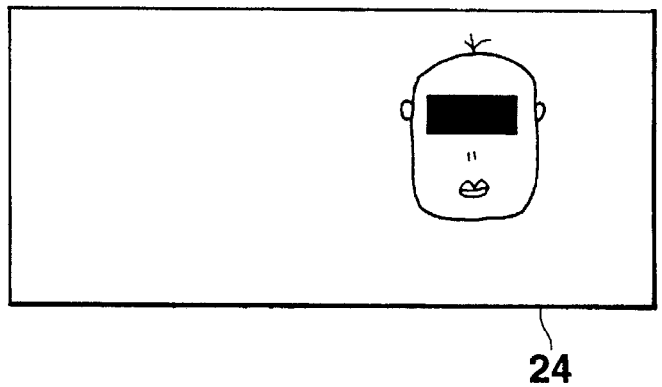
FIGS. 21A–21D show a portrait displayed with data in the ROM of FIG. 20.
Figure 21B:
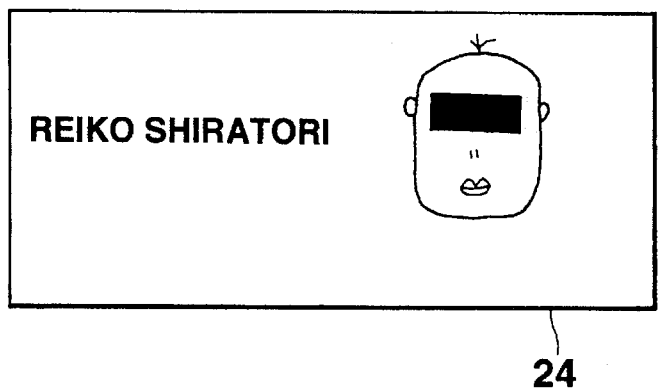
Figure 21C:
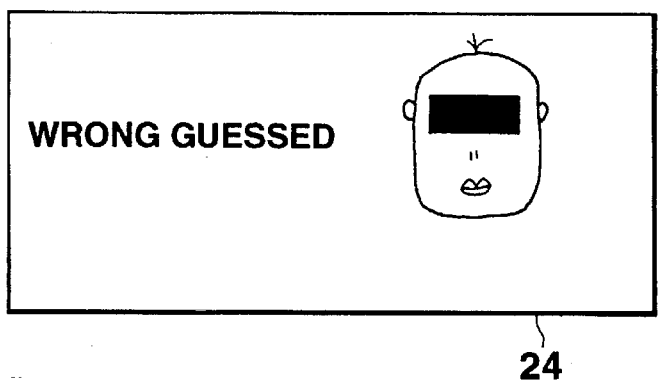
Figure 21D:
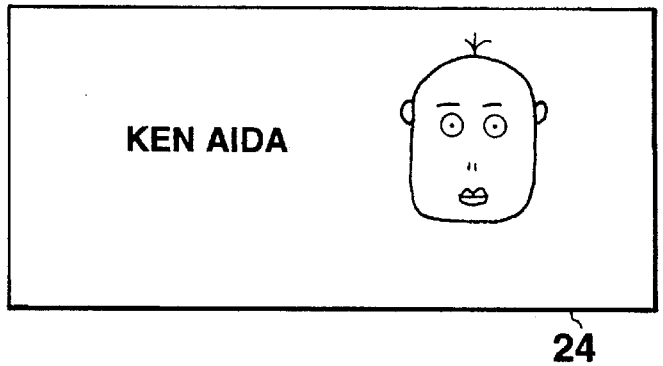

FIG. 20 shows another embodiment of the part pattern ROM 33 which includes storage areas 33A, 33B, 33C, 33D and 33E where image data items on masked patterns are stored in correspondence to the patterns of parts such as the face contour, hair style, eyes, nose and mouth. Image data items on the masked patterns stored in the storage areas 33A–33E are displayed on the display 24. Any one of those masked patterns can be selected by a select key (not shown). When a secret portrait is displayed and a silhouette guessing game is enjoyed, a portrait masked with a selected mask pattern is displayed. When, for example, a masked pattern of eyes is selected, a portrait with masked eyes is displayed, as shown in FIG. 21A, in a silhouette game. For example, when a name "Reiko Shiratori" is keyed in, as shown in FIG. 21B, and the silhouette is wrong guessed, this fact is displayed as shown in FIG. 21C. When a name "Ken Aida" is keyed in and hence the silhouette is right guessed, an unmasked portrait is displayed, as shown in FIG. 21D. It is to be noted that the number of part patterns to be masked is not limited to 1 (unity). For example, a plurality of parts such as "eyes" and "hair style" may be selected to display a plurality of masked parts of a single portrait.

What is claimed is:

1. An image display device comprising: name-data storage means for storing a plurality of persons' name data;

image-data storage means for storing a plurality of persons' portrait data corresponding respectively to the plurality of persons' name data stored in said name-data storage means;

discrimination-data storage means for storing discrimination data corresponding respectively to the plurality of persons' portrait data stored in said image-data storage means, each discrimination data indicating whether the corresponding persons' portrait data stored in said image-data storage means with part of the corresponding person's portrait data being masked or said corresponding person's portrait data with no part being masked is to be displayed;

selecting means for selecting one name data from among the plurality of persons' name data stored in said name-data storage means;

reading means for reading out the name data selected by said selecting means from said name-data storage means, for reading out person's portrait data corresponding to the selected name data from said image-data storage means, and for reading out discrimination data corresponding to the read out person's portrait data from said discrimination-data storage means;

display means for displaying the person's name data read out by said reading means and the person's portrait data read out by said reading means with part of the person's portrait data being masked when the discrimination data read out by said reading means indicates that the person's portrait data is to be displayed with part being masked, and for displaying the read out person's name data and the read out person's portrait data with no part being masked when the read out discrimination data indicates that the person's portrait data is to be displayed with no part being masked;

password storage means for storing predetermined password data;

data input means for inputting data;

checking means for checking whether the data input by said data storage means coincides with the password data stored in said password data storage means; and display control means, responsive to said checking means checking that the data input by said data input means coincides with the password data when the read out person's portrait data is displayed on said display means with at least part of the person's portrait data being masked, for changing to unmasked person's portrait data the person's portrait with at least part of the person's portrait data being masked.

2. An image display device according to claim 1, wherein the part of the person's portrait data being masked comprises data corresponding to at least an eye image.

* * * * *